(12) United States Patent
Yokoyama

(10) Patent No.: US 12,546,984 B2
(45) Date of Patent: Feb. 10, 2026

(54) INFORMATION PROCESSING APPARATUS, INFORMATION PROCESSING SYSTEM, INFORMATION PROCESSING METHOD, AND COMPUTER-READABLE RECORDING MEDIUM

(71) Applicant: Yokogawa Electric Corporation, Tokyo (JP)

(72) Inventor: Yasunori Yokoyama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 440 days.

(21) Appl. No.: 18/134,322

(22) Filed: Apr. 13, 2023

(65) Prior Publication Data

US 2023/0341670 A1 Oct. 26, 2023

(30) Foreign Application Priority Data

Apr. 22, 2022 (JP) .................................. 2022-070808

(51) Int. Cl.
  *G02B 21/08* (2006.01)
  *G02B 7/28* (2021.01)
  *G02B 21/36* (2006.01)

(52) U.S. Cl.
  CPC ............ *G02B 21/08* (2013.01); *G02B 7/28* (2013.01); *G02B 21/365* (2013.01)

(58) Field of Classification Search
  None
  See application file for complete search history.

(56) References Cited

U.S. PATENT DOCUMENTS

| 10,120,177 B2 * | 11/2018 | Okamoto ............... G02B 21/06 |
| 2016/0369217 A1 | 12/2016 | Jomura et al. |
| 2019/0285835 A1 | 9/2019 | Putman et al. |
| 2020/0264405 A1 | 8/2020 | Putman et al. |

(Continued)

FOREIGN PATENT DOCUMENTS

| JP | 5578779 B2 | 8/2014 |
| JP | 2017-506887 A | 3/2017 |
| JP | 2021516370 A | 7/2021 |

OTHER PUBLICATIONS

Japanese Office Action (JPOA) mailed on Nov. 4, 2025 and issued for Japanese patent application No. 2022-070808 and its English machine translation.

*Primary Examiner* — Robert E. Tallman
(74) *Attorney, Agent, or Firm* — RANKIN, HILL & CLARK LLP

(57) ABSTRACT

An information processing apparatus 4 acquire pieces of image data obtained by capturing an image of a target object to be observed by using a microscope 2 at respective positions of an object lens 21 of the microscope 2 while driving the object lens 21 in a light-axis direction of an illumination with which the target object is irradiated, the image being obtained by condensing light by using the object lens 21, specify a focusing position of the object lens 21 at which a focus of the target object is determined based on the pieces of image data, in a case where the object lens 21 is arranged in the focusing position, acquire, as a reference light receiving pattern, a light receiving pattern obtained by receiving, via the object lens 21, the focus detecting light (reflected light) 228 emitted to the target object via the object lens 21, and store the reference light receiving pattern in a storage.

10 Claims, 8 Drawing Sheets

(56) References Cited

U.S. PATENT DOCUMENTS

| | | | |
|---|---|---|---|
| 2021/0333533 A1* | 10/2021 | Chan | G02B 7/09 |
| 2021/0405339 A1* | 12/2021 | Dastidar | G02B 21/365 |
| 2022/0229267 A1 | 7/2022 | Putman et al. | |

* cited by examiner

INFORMATION PROCESSING APPARATUS, INFORMATION PROCESSING SYSTEM, INFORMATION PROCESSING METHOD, AND COMPUTER-READABLE RECORDING MEDIUM

CROSS-REFERENCE TO RELATED APPLICATION

The present application claims priority to and incorporates by reference the entire contents of Japanese Patent Application No. 2022-070808 filed in Japan on Apr. 22, 2022.

FIELD

An exemplary embodiment disclosed herein relates to an information processing apparatus, an information processing system, an information processing method, and a computer-readable recording medium.

BACKGROUND

Conventionally, in capturing a sample by using a microscope, there presents a technology that determines a focusing point of an object lens on the basis of a size and a position of a spot of a focus detecting light that is changed by driving the object lens of the microscope in a light-axis direction thereof.

Patent Literature 1: US Patent Application Publication No. 2021/0333533
Patent Literature 2: Japanese Patent No. 5578779
Patent Literature 3: Patent Application Laid-open (Translation of PCT Application) No. 2017-506887

However, in the conventional technology, it is difficult to quickly execute automatic focusing. For example, the above-mentioned conventional technology assumes that a bottom surface of a container is planar and uniform, in a case of a three-dimensionally cultured cell container, a focus detecting light is not normally reflected, a spot of a focus detecting light which is acquired by an image capturing device is accordingly deformed, and thus it may be impossible to easily determine a focusing point in some cases.

One aspect of the present disclosure is made in view of the aforementioned, and an object of an embodiment is to quickly execute automatic focusing.

SUMMARY

According to an aspect of the embodiments, an information processing apparatus includes, a first acquisition unit that acquires pieces of image data obtained by capturing an image of a target object to be observed by using a microscope at respective positions of an object lens of the microscope while driving the object lens in a light-axis direction of an illumination with which the target object is irradiated, the image being obtained by condensing light by using the object lens, a first specifying unit that specifies a focusing position of the object lens at which a focus of the target object is determined based on the pieces of image data, and a second acquisition unit that in a case where the object lens is arranged in the focusing position, acquire, as a reference light receiving pattern, a light receiving pattern obtained by receiving, via the object lens, reflected light of a focus detecting light emitted to the target object via the object lens, and store the reference light receiving pattern in a storage.

According to an aspect of the embodiments, an information processing system includes, an image capturing device, a microscope, and, an information processing apparatus, wherein the image capturing device captures a plurality of images of a target object to be observed by using the microscope at respective positions of an object lens of the microscope while driving the object lens in a light-axis direction of an illumination with which the target object is irradiated, the image being obtained by condensing light by using the object lens, the microscope includes a light emitting device that emits a focus detecting light toward the target object via the object lens, and the information processing apparatus includes, a first acquisition unit that acquires pieces of image data obtained by capturing the image of the target object to be observed by using the image capturing device, a first specifying unit that specifies, based on the pieces of image data, a focusing position of the object lens at which a focus of the target object is determined, and a second acquisition unit that in a case where the object lens is arranged in the focusing position, acquire, as a reference light receiving pattern, a light receiving pattern obtained by receiving, via the object lens, reflected light of the focus detecting light emitted to the target object via the object lens, and store the reference light receiving pattern in a storage.

According to an aspect of the embodiments, an information processing method includes, acquiring pieces of image data obtained by capturing an image of a target object to be observed by using a microscope at respective positions of an object lens of the microscope while driving the object lens in a light-axis direction of an illumination with which the target object is irradiated, the image being obtained by condensing light by using the object lens, based on the pieces of image data, specifying a focusing position of the object lens at which a focus of the target object is determined, in a case where the object lens is arranged in the focusing position, acquiring, as a reference light receiving pattern, a light receiving pattern obtained by receiving, via the object lens, reflected light of a focus detecting light emitted to the target object via the object lens, and storing the reference light receiving pattern in a storage.

According to an aspect of the embodiments, a computer-readable recording medium having stored therein an information processing program that causes a computer to execute a process includes, acquiring pieces of image data obtained by capturing an image of a target object to be observed by using a microscope at respective positions of an object lens of the microscope while driving the object lens in a light-axis direction of an illumination with which the target object is irradiated, the image being obtained by condensing light by using the object lens, based on the pieces of image data, specifying a focusing position of the object lens at which a focus of the target object is determined, in a case where the object lens is arranged in the focusing position, acquiring, as a reference light receiving pattern, a light receiving pattern obtained by receiving, via the object lens, reflected light of a focus detecting light emitted to the target object via the object lens, and storing the reference light receiving pattern in a storage.

DESCRIPTION OF EMBODIMENTS

Hereinafter, an embodiment of an information processing apparatus, an information processing system, an information processing method, and an information processing program according to the present disclosure will be described in detail with reference to the accompanying drawings. The present disclosure is not limited to the embodiment described in the following.

Embodiment

Hereinafter, a configuration of an information processing system according to the embodiment, configurations of an information processing apparatus according to the embodiment and the like, flows of processes according to the embodiment will be explained in this order, and further effects of the embodiment will be finally explained.

1. Configuration of Information Processing System 100

Figure 1:
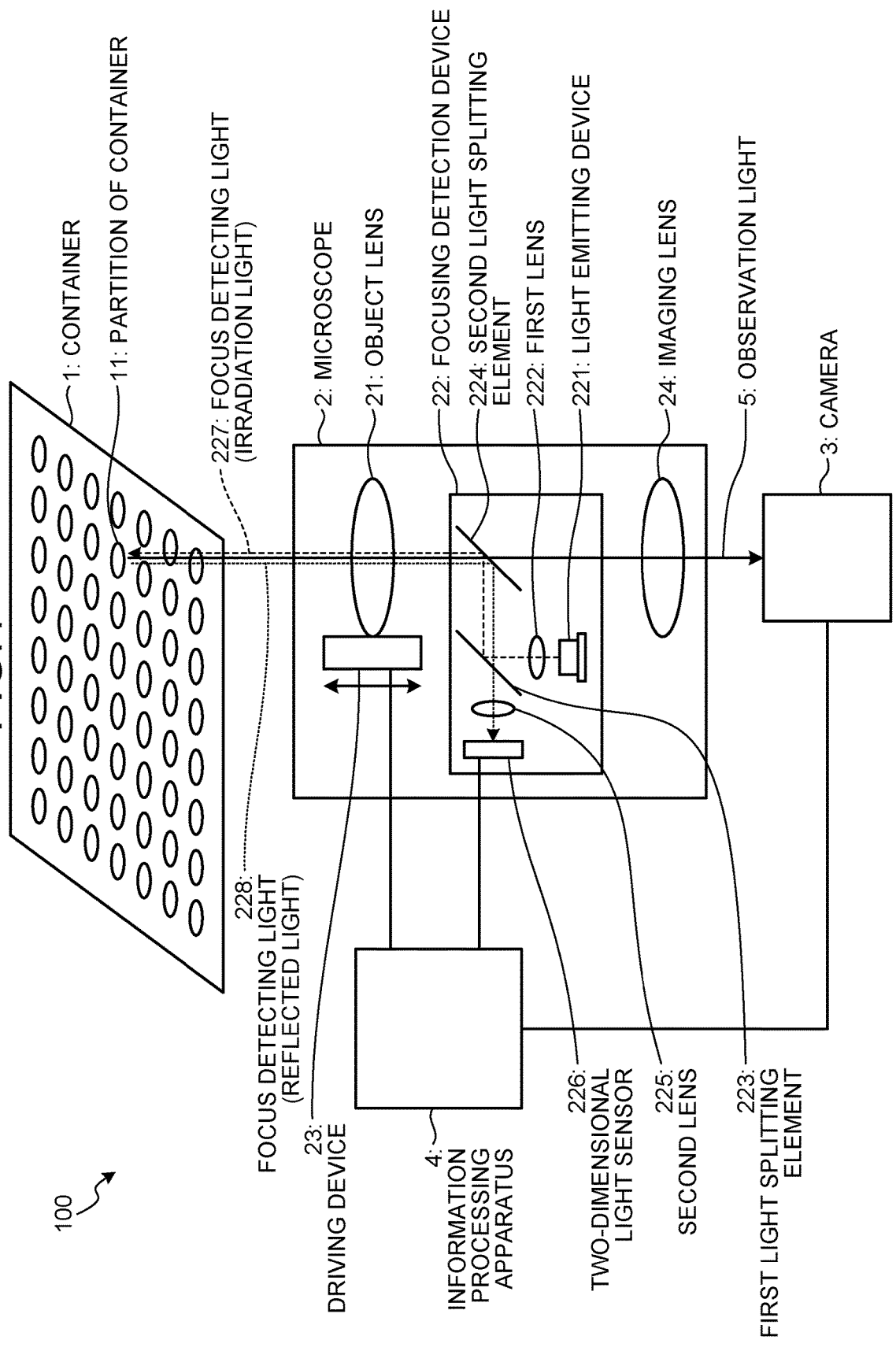
FIG. 1 is a diagram illustrating a configuration example of an information processing system according to an embodiment.

A configuration of an information processing system 100 according to the embodiment will be specifically explained with reference to FIG. 1. FIG. 1 is a diagram illustrating a configuration example of the information processing system 100 according to the embodiment. Hereinafter, a configuration example of the whole information processing system 100, processes of the information processing system 100, and effects the information processing system 100 will be explained in this order.

1-1. Configuration Example of Whole Information Processing System 100

The information processing system 100 includes a container 1, a microscope 2, a camera 3 that is an image capturing device, and an information processing apparatus 4. The information processing system 100 illustrated in FIG. 1 may include the plurality of containers 1, the plurality of microscopes 2, the plurality of cameras 3, or the plurality of information processing apparatuses 4. Note that the information processing apparatus 4 may have a configuration in which the information processing apparatus 4 is integrated with one or more of the microscope 2 and the camera 3. Hereinafter, the container 1, the microscope 2, the camera 3, and the information processing apparatus 4 will be explained.

1-1-1. Container 1

The container 1 includes a plurality of partitions 11 each of which stores therein a sample such as a culturing cell to be observed by the microscope 2. In the following explanation, the plurality of partitions 11 may be indicated as a first partition 11-1, a second partition 11-2, and the like. The container 1 is placed on a not-illustrated pedestal so that the microscope 2 is capable of observing a sample.

1-1-2. Microscope 2

The microscope 2 includes an object lens 21, a focusing detection device 22, a driving device 23, and an imaging lens 24. Herein, the object lens 21 is arranged between the container 1 and the focusing detection device 22 in a light-axis direction (may be referred to as "Z-direction") and a position thereof can be changed by the driving device 23. The focusing detection device 22 includes a light emitting device 221, a first lens 222, a first light splitting element 223, a second light splitting element 224, a second lens 225, and a two-dimensional light sensor 226. The driving device 23 is connected to the information processing apparatus 4 to be controllable so as to drive the object lens 21 in the Z-direction on the basis of a signal transmitted from the information processing apparatus 4. The imaging lens 24 is arranged between the focusing detection device 22 and the camera 3 in the Z-direction.

1-1-3. Camera 3

The camera 3 is arranged so as to receive an observation light 5 emitted from a sample via the microscope 2. Hereinafter, the camera 3 captures a reception light image on the basis of a signal transmitted from the information processing apparatus 4 so as to transmit image data of the reception light image to the information processing apparatus 4.

1-1-4. Information Processing Apparatus 4

The information processing apparatus 4 is connected to the microscope 2 so as to control a driving process of the driving device 23 included in the microscope 2. The information processing apparatus 4 is connected to the microscope 2 so as to acquire a pattern (may be referred to as "light receiving pattern") of a focus detecting light (reflected light) 228 via the two-dimensional light sensor 226 included in the microscope 2. The information processing apparatus 4 is connected to the camera 3, and further controls a capturing process and the camera 3 so as to acquire image data of a captured sample.

1-2. Processes of Whole Information Processing System 100

Processes of the above-mentioned whole information processing system 100 will be explained. Note that the following processes can be executed in a different order. A part of the following processes may be skipped.

1-2-1. Light Receiving Pattern Acquiring Process

Hereinafter, with reference to FIG. 1, a process for acquiring a light receiving pattern of the focus detecting light (reflected light) 228 emitted from the container 1 will be explained.

The focusing detection device 22 causes the light emitting device 221 to emit light so as to emit a focus detecting light. In this case, a focus detecting light (irradiation light) 227 emitted from the light emitting device 221 is converted into a parallel light by the first lens 222, is reflected from the first light splitting element 223, is reflected from the second light splitting element 224, is condensed by the object lens 21, and further is led to the container 1. The focus detecting light (reflected light) 228 reflected from a bottom surface of the container 1 goes through the object lens 21 again, is reflected from the second light splitting element 224, passes through the first light splitting element 223, is condensed by the second lens 225, and further is received by the two-dimensional light sensor 226. The information processing apparatus 4 acquires a light receiving pattern from the two-dimensional light sensor 226 as image data.

Figure 2:
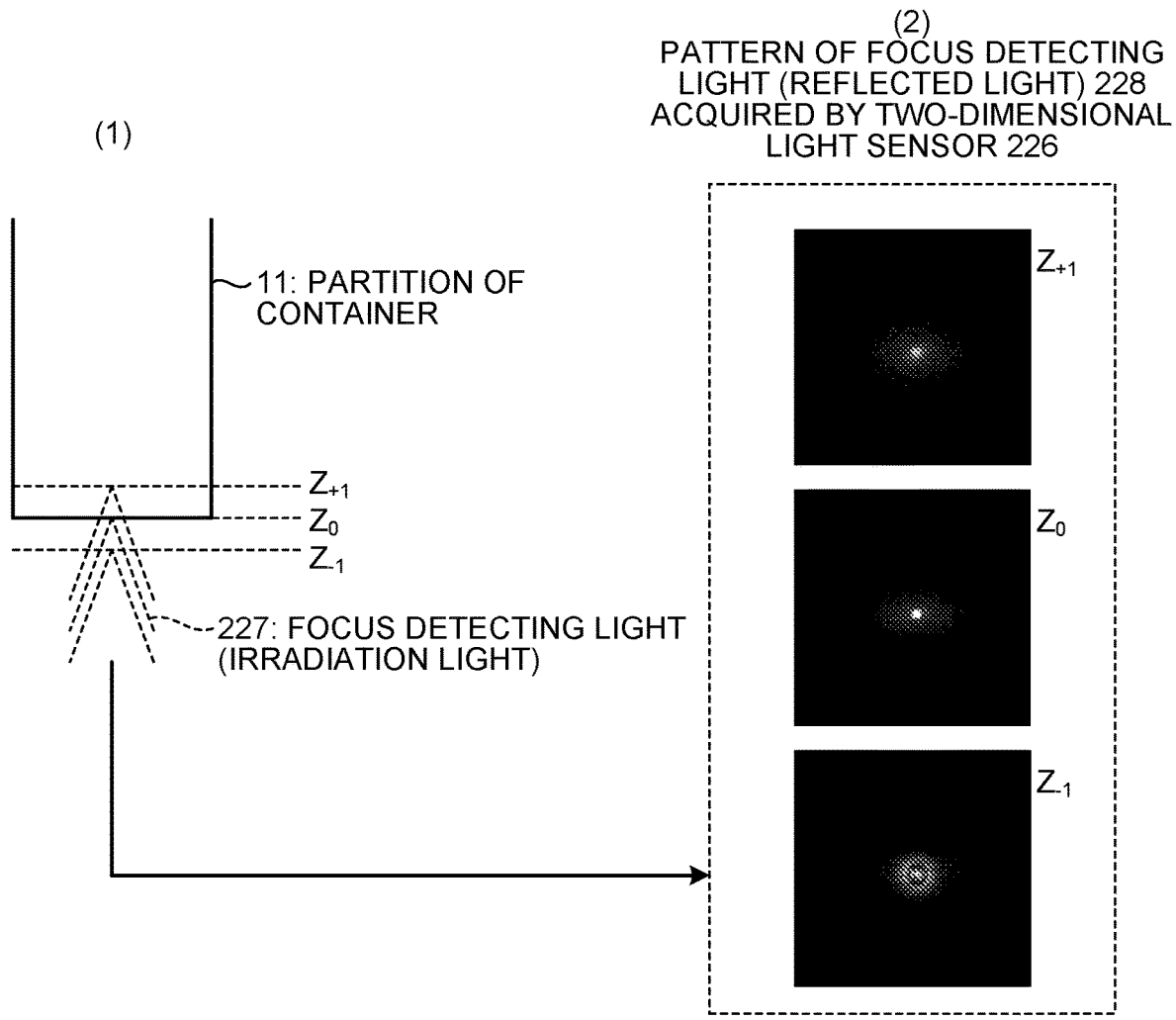
FIG. 2 is a diagram illustrating one example of a light receiving pattern 1 of a focus detecting light according to the embodiment.
Figure 3:
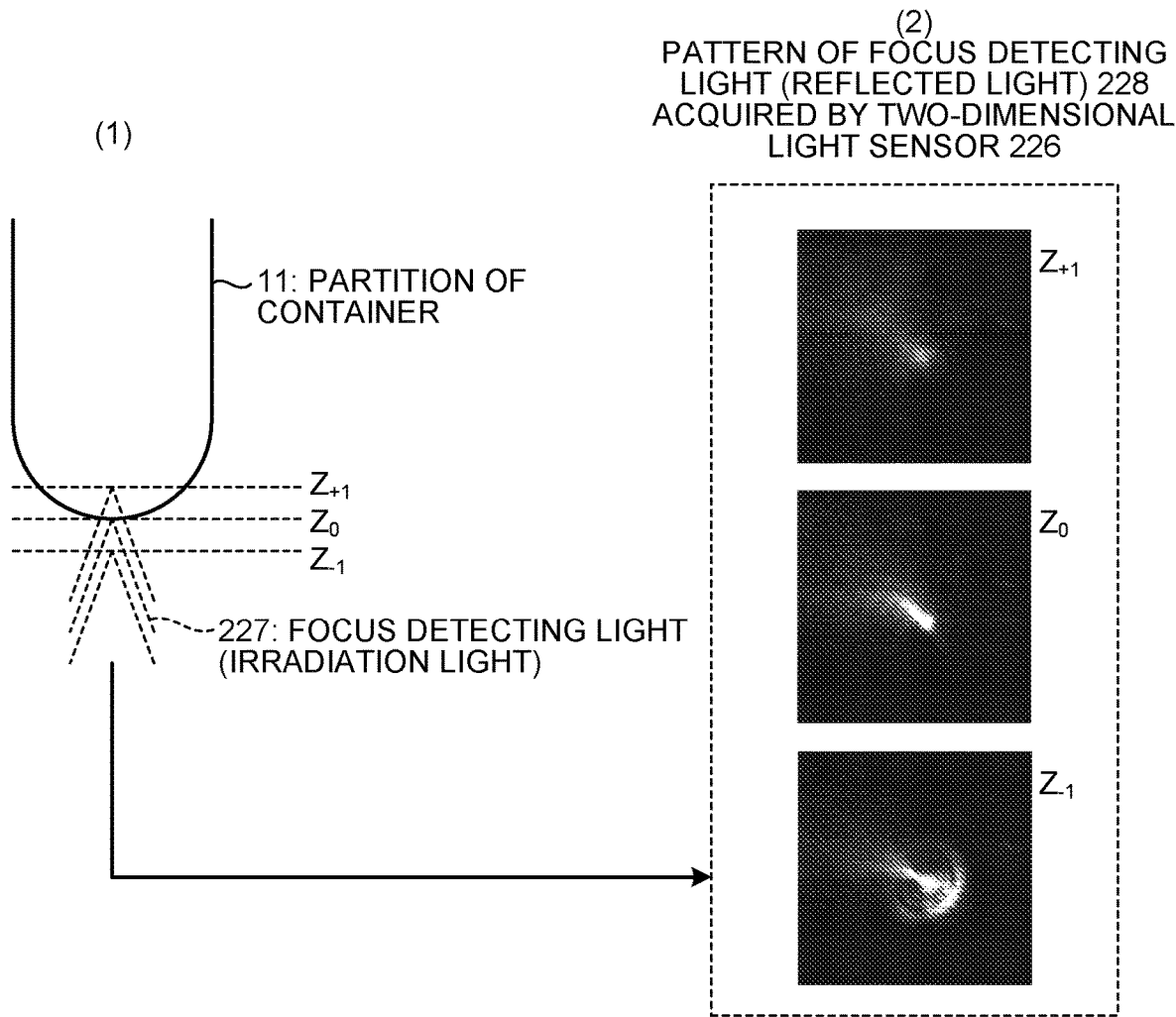
FIG. 3 is a diagram illustrating one example of a light receiving pattern 2 of a focus detecting light according to the embodiment.

In a case where a position (may be referred to as "Z-position") in the Z-direction of the object lens 21 is changed by the driving device 23 and further the above-mentioned process is executed, a state of the focus detecting light (reflected light) 228 is changed depending on difference in a Z-position of the object lens 21, in other words, difference in an irradiation state of the focus detecting light (irradiation light) 227 with respect to the container 1, and thus a light receiving pattern to be projected on the two-dimensional light sensor 226 is changed. In this case, in a case where a bottom surface of the container 1 is flat (planar) as illustrated in FIG. 2(1), a light receiving pattern of the focus detecting light (reflected light) 228 is regular, and thus focus detection is easy. However, in a case where a bottom surface of the container 1 is a curved surface as illustrated in FIG. 3(1), a light receiving pattern of the focus detecting light (reflected light) 228 is irregular, and thus execution of focus detection using the above-mentioned light receiving pattern alone is difficult.

1-2-2. Light Receiving Pattern

Herein, with reference to FIG. 2 to FIG. 3, a light receiving pattern acquired by the information processing apparatus 4 will be explained. Hereinafter, a light receiving pattern 1 in a case where a bottom surface of the container 1 is planar and a light receiving pattern 2 in a case where a bottom surface of the container 1 is a curved surface will be explained.

1-2-2-1. Light Receiving Pattern 1

With reference to FIG. 2, the light receiving pattern 1 in a case where a bottom surface of the container 1 is planar will be explained. FIG. 2 is a diagram illustrating one example of the light receiving pattern 1 of a focus detecting light according to the embodiment.

With reference to FIG. 2(1), a relation will be explained between the partition 11 of a container and a reflection position of the focus detecting light (irradiation light) 227 caused by difference in a Z-position of the object lens 21. $Z_0$ that is a Z-position of the object lens 21 is a position in which a bottom surface of the partition 11 in a container coincides with a focus. As indicated in an example illustrated in FIG. 2(1), in a case where the object lens 21 is at $Z_0$, the focus detecting light (irradiation light) 227 reflects from a bottom surface of the partition 11 in the container. Furthermore, $Z_{+1}$ that is a Z-position of the object lens 21 is a position obtained by moving the object lens 21 close to the container 1 in the Z-direction. As indicated in the example illustrated in FIG. 2(1), in a case where the object lens 21 is at $Z_{+1}$, the focus detecting light (irradiation light) 227 reflects from a position in the Z-direction that is farther from the object lens 21 than a bottom surface of the partition 11 in the container. $Z_{-1}$ that is a Z-position of the object lens 21 is a position obtained by moving the object lens 21 away from the container 1 in the Z-direction. As indicated in the example illustrated in FIG. 2(1), in a case where the object lens 21 is at $Z_{-1}$, the focus detecting light (irradiation light) 227 reflects from a position in the Z-direction that is closer to the object lens 21 than a bottom surface of the partition 11 in the container.

With reference to FIG. 2(2), a light receiving pattern of the focus detecting light (reflected light) 228 caused by difference in a Z-position of the object lens 21, which is projected on the two-dimensional light sensor 226, will be explained. As indicated in the example illustrated in FIG. 2(2), in a case where the object lens 21 is at $Z_0$, a light receiving pattern of the focus detecting light (reflected light) 228 is obtained as a spot that is clear and further the smallest. On the other hand, as indicated in the example illustrated in FIG. 2(2), in a case where the object lens 21 is at $Z_{+1}$ or $Z_{-1}$, a light receiving pattern of the focus detecting light (reflected light) 228 is obtained as an unclear spot. In other words, in a case where a bottom surface of the container 1 is planar as illustrated in FIG. 2(1), a light receiving pattern of the focus detecting light (reflected light) 228 is regular, and thus focus detection is easy.

1-2-2-2. Light Receiving Pattern 2

With reference to FIG. 3, the light receiving pattern 2 in a case where a bottom surface of the container 1 is a curved surface will be explained. FIG. 3 is a diagram illustrating one example of the light receiving pattern 2 of a focus detecting light according to the embodiment.

With reference to FIG. 3(1), a relation will be explained between the partition 11 of a container and a reflection position of the focus detecting light (irradiation light) 227 caused by difference in a Z-position of the object lens 21. Herein, $Z_0$ that is a Z-position of the object lens 21 is a position in which a bottom surface of the partition 11 in a container coincides with a focus. As indicated in an example illustrated in FIG. 3(1), in a case where the object lens 21 is at $Z_0$, the focus detecting light (irradiation light) 227 reflects from a bottom surface of the partition 11 in the container. Furthermore, $Z_{+1}$ that is a Z-position of the object lens 21 is a position obtained by moving the object lens 21 close to the container 1 in the Z-direction. As indicated in the example illustrated in FIG. 3(1), in a case where the object lens 21 is at $Z_{+1}$, the focus detecting light (irradiation light) 227 reflects from a position in the Z-direction that is farther from the object lens 21 than a bottom surface of the partition 11 in the container. $Z_{-1}$ that is a Z-position of the object lens 21 is a position obtained by moving the object lens 21 away from the container 1 in the Z-direction. As indicated in the example illustrated in FIG. 3(1), in a case where the object lens 21 is at $Z_{-1}$, the focus detecting light (irradiation light) 227 reflects from a position in the Z-direction that is closer to the object lens 21 than a bottom surface of the partition 11 in the container.

With reference to FIG. 3(2), a light receiving pattern of the focus detecting light (reflected light) 228 caused by difference in a Z-position of the object lens 21, which is projected on the two-dimensional light sensor 226, will be explained. As indicated in the example illustrated in FIG. 3(2), regardless of Z-positions of the object lens 21 at $Z_0$, $Z_{+1}$, and $Z_{-1}$, a light receiving pattern of the focus detecting light (reflected light) 228 by the object lens 21 is obtained as an unclear spot. In other words, in a case where a bottom surface of the container 1 is a curved surface as illustrated in FIG. 3(1), a light receiving pattern of the focus detecting light (reflected light) 228 becomes irregular, and thus execution of focus detection using the above-mentioned light receiving pattern alone is difficult.

1-2-3. Reference Light Receiving Pattern Acquiring Process

Figure 4:
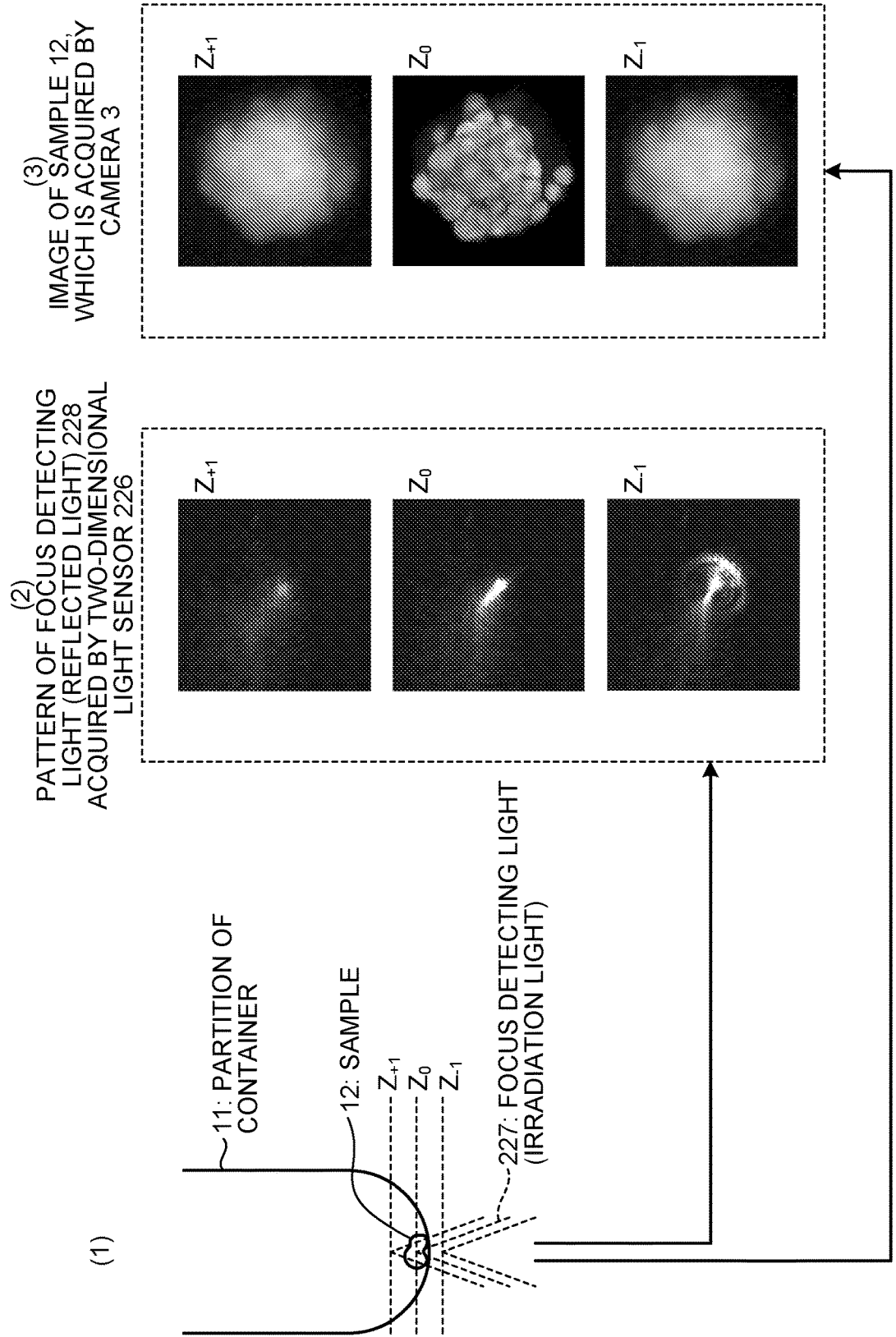
FIG. 4 is a diagram illustrating one example of a reference light receiving pattern specifying process according to the embodiment.

Herein, with reference to FIG. 4, in a case where a bottom surface of the container 1 is a curved surface and further a sample 12 is stored in the partition 11, a process for acquiring a reference pattern (reference light receiving pattern) of a light receiving pattern will be explained. FIG. 4 is a diagram illustrating one example of a reference light receiving pattern specifying process according to the embodiment. Hereinafter, a reflection position of the focus detecting light (irradiation light) 227, a light receiving pattern of the focus detecting light (reflected light) 228, and image data of the sample 12 will be explained, and then a reference light receiving pattern acquiring process will be explained.

1-2-3-1. Reflection Position of Focus Detecting Light (Irradiation Light) 227

With reference to FIG. 4(1), a relation will be explained between the partition 11 of a container and a reflection position of the focus detecting light (irradiation light) 227 caused by difference in a Z-position of the object lens 21. $Z_0$ that is a Z-position of the object lens 21 is a position in which the sample 12 of the partition 11 in a container coincides with a focus. As indicated in an example illustrated in FIG. 4(1), in a case where the object lens 21 is at $Z_0$, the focus detecting light (irradiation light) 227 reflects from the sample 12 of the partition 11 in the container. Furthermore, $Z_{+1}$ that is a Z-position of the object lens 21 is a position obtained by moving the object lens 21 close to the container 1 in the Z-direction. As indicated in the example illustrated in FIG. 4(1), in a case where the object lens 21 is at $Z_{+1}$, the focus detecting light (irradiation light) 227 reflects from a position in the Z-direction that is farther from the object lens 21 than the sample 12 of the partition 11 in the container. $Z_{-1}$ that is a Z-position of the object lens 21 is a position obtained by moving the object lens 21 away from the container 1 in the Z-direction. As indicated in the example illustrated in FIG. 4(1), in a case where the object lens 21 is at $Z_{-1}$, the focus detecting light (irradiation light) 227 reflects from a position in the Z-direction that is closer to the object lens 21 than the sample 12 of the partition 11 in the container.

1-2-3-2. Light Receiving Pattern of Focus Detecting Light (Reflected Light) 228

With reference to FIG. 4(2), a light receiving pattern of the focus detecting light (reflected light) 228 caused by difference in a Z-position of the object lens 21, which is projected on the two-dimensional light sensor 226, will be explained. As indicated in the example illustrated in FIG. 4(2), regardless of Z-positions of the object lens 21 at $Z_0$, $Z_{+1}$, and $Z_{-1}$, a light receiving pattern of the focus detecting light (reflected light) 228 by the object lens 21 is obtained as an unclear spot. In other words, in a case where a bottom surface of the container 1 is a curved surface as illustrated in FIG. 4(1), similar to the above-mentioned case illustrated in FIG. 3(1), a light receiving pattern of the focus detecting light (reflected light) 228 becomes irregular, and thus execution of focus detection using the above-mentioned light receiving pattern alone is difficult.

1-2-3-3. Image Data of Sample 12

With reference to FIG. 4(3), image data of the sample 12 due to difference in a Z-position of the object lens 21, which is captured by the camera 3, will be explained. As indicated by the example illustrated in FIG. 4(3), in a case where the object lens 21 is at $Z_0$, the sample 12 is captured as a clear image. On the other hand, as indicated in the example illustrated in FIG. 4(3), in a case where the object lens 21 is at $Z_{+1}$ or $Z_{-1}$, the sample 12 is captured as an unclear image.

1-2-3-4. Reference Light Receiving Pattern Acquiring Process

With reference to FIG. 1, a process for acquiring a reference light receiving pattern will be explained in a case where a bottom surface of the container 1 exemplified in the example illustrated in FIG. 4 is a curved surface and the container 1 stores the sample 12 in the partition 11 thereof. Note that details of the reference light receiving pattern acquiring process will be mentioned later in the following <3. Flow of Process of Information Processing System 100> and <3-1. Flow of Reference Light Receiving Pattern Acquiring Process>.

First, an illuminating device (not illustrated) irradiates the sample 12 stored in the partition 11 of the container 1 with an illumination. In this case, the observation light 5 emitted from the sample 12 which is caused by irradiation of the illumination passes through the object lens 21, passes through the second light splitting element 224, is condensed by the imaging lens 24, and is made incident on the camera 3.

Next, the driving device 23 of the microscope 2 drives the object lens 21 in accordance with a signal of the information processing apparatus 4 so as to change a Z-position of the object lens 21. The camera 3 repeats a capturing process, and further transfers the captured image data to the information processing apparatus 4. In this case, the information processing apparatus 4 associates the transferred image data with a corresponding Z-position of the object lens 21.

Subsequently, the information processing apparatus 4 analyzes the acquired image data, selects image data in which a focus coincides most with the sample 12, and determines a Z-position of the object lens 21 corresponding to the selected image data to be a focusing position $Z_f$. In this case, the information processing apparatus 4 uses a feature amount (e.g., luminance value, contrast value) of image data so as to specify the focusing position $Z_f$.

After lights-out of an illuminating device (not illustrated), the driving device 23 of the microscope 2 drives the object lens 21 in accordance with a signal of the information processing apparatus 4 so as to move the object lens 21 to the focusing position $Z_f$.

Finally, the information processing apparatus 4 acquires a light receiving pattern on the two-dimensional light sensor 226 of the focus detecting light (reflected light) 228 returned from the container 1, which is caused by light emission of the light emitting device 221 of the microscope 2, and further determines the light receiving pattern to be a focused reference pattern, in other words, a reference light receiving pattern. In this case, the information processing apparatus 4 stores therein the acquired reference light receiving pattern and the focusing position $Z_f$ in association with each other.

Note that the information processing apparatus 4 may execute the above-mentioned reference light receiving pattern acquiring process every time capturing the container 1. The information processing apparatus 4 may preliminarily execute the reference light receiving pattern acquiring process for each combination of types of the object lens 21 and the container 1, may store reference light receiving patterns of the respective combinations in a storage 44 of the information processing apparatus 4 which is to be mentioned later, and may read and use it in a sample capturing process as needed.

1-2-4. Sample Capturing Process

With reference to FIG. 1, a process will be explained for capturing a sample on the basis of a reference light receiving pattern obtained by the above-mentioned reference light receiving pattern acquiring process. Note that details of the sample capturing process will be mentioned later in the following <3. Flow of Process of Information Processing System 100> and <3-2. Flow of Sample Capturing Process>.

First, the information processing apparatus 4 acquires a light receiving pattern on the two-dimensional light sensor 226 of the focus detecting light (reflected light) 228 returned from the container 1, which is caused by light emission of the light emitting device 221 of the microscope 2. In this case, the information processing apparatus 4 transmits a signal to the driving device 23 of the microscope 2 so as to acquire a plurality of light receiving patterns while driving the object lens 21 in the Z-direction.

Next, the information processing apparatus 4 specifies a light receiving pattern that coincides with a reference light receiving pattern, determines a Z-position at which the above-mentioned light receiving pattern is obtained to be a focusing position (capturing reference position) $Z_{f1}$. In this case, the information processing apparatus 4 may execute a coincidence determination of the light receiving pattern by using a cross-correlation value of images, or may calculate a similarity degree by using a machine learning model so as to execute the coincidence determination.

After lights-out of the light emitting device 221, an illuminating device (not illustrated) irradiates the sample 12 stored in the partition 11 of the container 1 with an illumination. The driving device 23 of the microscope 2 drives the object lens 21 in accordance with a signal of the information processing apparatus 4 so as to move the object lens 21 to a focusing position $Z_{f1}$. Finally, the camera 3 captures the sample 12 while determining the focusing position $Z_{f1}$ to be a reference Z-position, and further transfers the captured image data to the information processing apparatus 4.

1-3. Effects of Information Processing System 100

Hereinafter, a problem of a technology that is used as general automatic focusing and a general capturing process will be explained as a reference technology, and then effects of the information processing system 100 will be explained.

1-3-1. Problem

In a reference technology disclosed in Patent Literature 1, a focus detecting light emitted from a light source is converted into a parallel light by a first lens, is reflected from a beam splitter, is condensed by an object lens, is reflected from a plate, passes through the object lens again, passes through the beam splitter, passes through an aperture, is condensed by a second lens, and is made incident on an image capturing device. In this case, if the object lens is driven in a light-axis direction, a position and a size of a spot of a focus detecting light which is captured by the image capturing device changes. A focusing point with respect to the plate of the object lens is determined on the basis of a size and a position of a spot of the focus detecting light. The above-mentioned technology has the following problem.

First, in the recent research in biology and pharmacy, it is important to execute a cell experiment under a condition closer to in vivo by not plane culturing but three-dimensional culturing. In such a tide, generation of a cell aggregate is generally employed. For example, in Patent Literature 2, a cell container whose cell culturing surface is a curved surface is used for facilitating formation of a cell aggregate. In Patent Literature 3, a cell container in which a three-dimensional structure is formed on a cell culturing surface thereof is used for facilitating formation of a cell aggregate.

On the other hand, a technology of automatic focusing in a reference technology disclosed in Patent Literature 1 has a hypothesis that a bottom surface of a cell container is planar and uniform, in a case of a cell container (see Patent Literature 2, for example) whose cell culturing surface is a curved surface or a cell container (see Patent Literature 3, for example) in which a three-dimensional structure is formed on a cell culturing surface thereof, a focus detecting light is not normally reflected, a spot of a focus detecting light which is acquired by an image capturing device is deformed, and thus there presents a problem that easy determination of a focusing point may be impossible. Specifically, even if an object lens is focused with respect to a cell container, a spot of a focus detecting light in an image capturing device is deformed due to aberration of a focus detecting light caused by a curved surface of a cell culturing surface in a case of a cell container whose cell culturing surface is a curved surface, or due to diffusion of a focus detecting light caused by a three-dimensional structure on a cell culturing surface in a case of a cell container in which a three-dimensional structure is formed on a cell culturing surface thereof, and thus determination of a size and a position may be impossible.

In another reference technology, there presents a method in which a cell image to be a target is captured every time a position of an object lens is changed along a light axis thereof, and a focusing point is determined by using a feature amount (e.g., luminance value, contrast value) of the image. According to the above-mentioned method, it is possible to search a focusing point regardless of a state of a bottom surface of a cell container.

However, in the above-mentioned technology, a cell image must be captured for each position of an object lens, and thus there presents a problem that a focus searching time interval is increased due to a capturing exposure time interval, a transferring time interval of data from an image capturing device to a processing device, an analysis time interval of an image, and the like. In the above-mentioned technology, in a case where a capturing type of a cell is an epifluorescent type, a fluorescence confocal type, or the like; a cell is irradiated with excitation light, and thus there presents a problem leading to color deterioration of a fluorescent dye, optical damage against a cell, etc.

1-3-2. Outline

The information processing system 100 is configured to: acquire pieces of image data obtained by capturing an image of the sample 12 to be observed by using the microscope 2 at respective positions while driving the object lens 21 of the microscope 2 in a light-axis direction of an illumination with which the sample 12 is irradiated, the image being obtained by condensing light by using the object lens 21; specify a focusing position $Z_f$ of the object lens 21 at which a focus of the sample 12 is determined based on the pieces of the image data; in a case where the object lens 21 is arranged in the focusing position $Z_f$, acquire a light receiving pattern obtained by receiving, via the object lens 21, the focus detecting light (reflected light) 228 emitted to the sample 12 via the object lens 21 as a reference light receiving pattern; and store the reference light receiving pattern in the storage 44. In this case, in the information processing system 100, capturing of the sample 12 is executed by using the microscope 2 in which the object lens 21 is arranged at the focusing position $Z_f$ at which the reference light receiving pattern is acquired.

The information processing system 100 is configured to: in a case where the sample 12 is captured again, acquire a plurality of light receiving patterns at respective positions of the object lens 21 driven along the light-axis direction in a case where the sample 12 is irradiated with the focus detecting light; specify a capturing reference position (focusing position) $Z_{f1}$ of the object lens 21 that captures the sample 12 by using a similarity degree between the reference light receiving pattern stored in the storage 44 and each of the plurality of light receiving patterns; and capture the sample 12 by using the microscope 2 in which the object lens is arranged at the capturing reference position $Z_{f1}$.

1-3-3. Effects

The information processing system 100 is capable of executing focus detection based on a light that is reflected from a bottom surface of a sample container, even in a case of a cell container for forming a cell aggregate, which has a special shape and thus provides irregular reflection from the bottom surface. In other words, regardless of a case where a bottom surface of a sample container is planar or a curved surface, the information processing system 100 is capable of specifying a focusing position of the object lens 21, so that it is possible to quickly execute automatic focusing of the microscope 2.

The information processing system 100 does not need a long focus searching time interval for an exposure time interval of capturing, a transferring time interval of data from an image capturing device to a processing device, or a time interval of image analysis, and thus in a case where a capturing type of a cell is an epifluorescent type or a fluorescence confocal type, there presents little risk of occurrence of color deterioration of a fluorescent dye or optical damage against a cell. In other words, the information processing system 100 is capable of specifying a focusing position regardless of a type of a sample (capturing target) so as to execute capturing.

2. Configurations of Devices in Information Processing System 100

Figure 5:
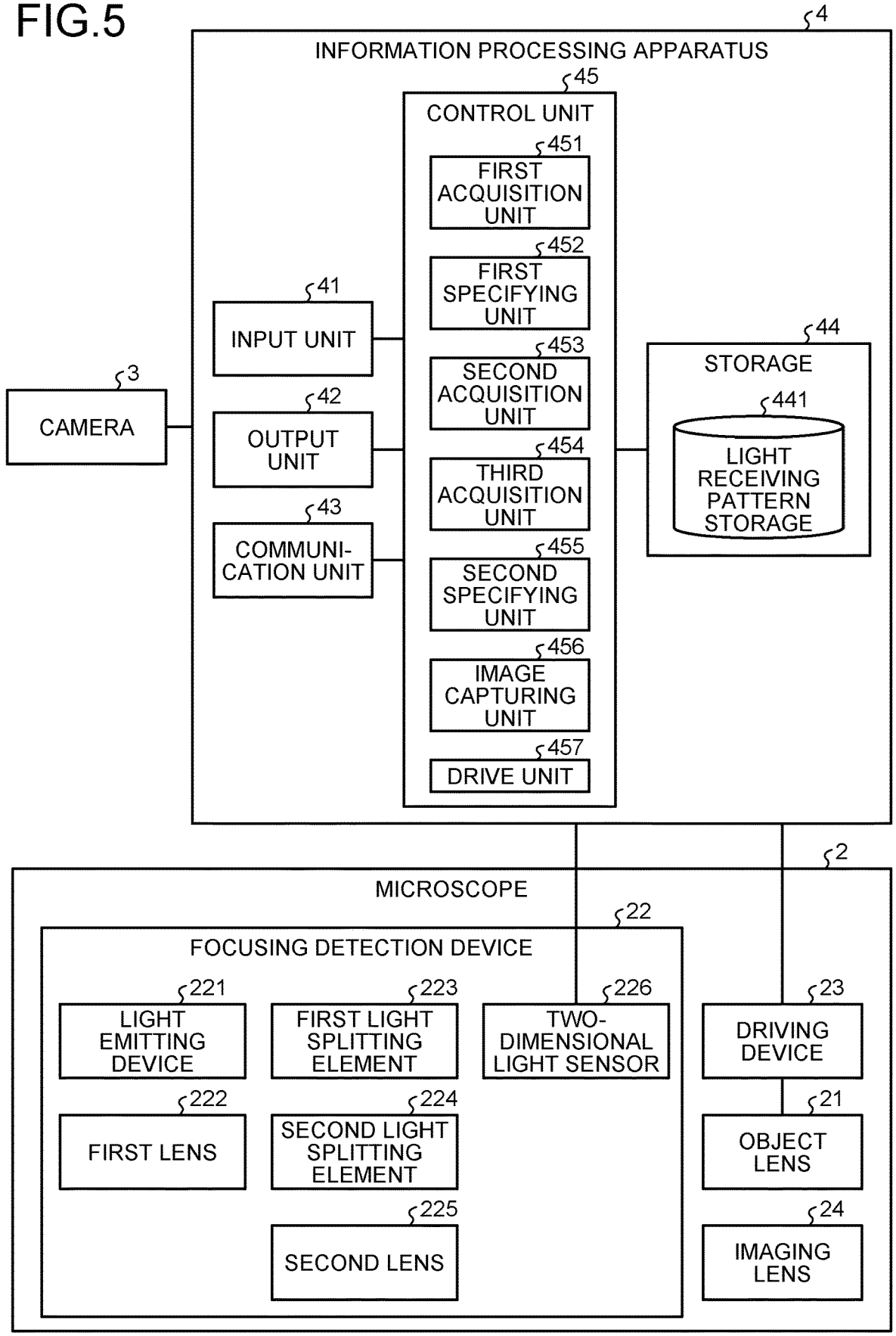
FIG. 5 is a block diagram illustrating a configuration example of devices in the information processing system according to the embodiment.

With reference to FIG. 5, functional configurations of devices included in the information processing system 100 illustrated in FIG. 1 will be explained. Hereinafter, details of a configuration example of the information processing apparatus 4 according to the embodiment, a configuration example of the microscope 2 according to the embodiment, and a process to be executed by the camera 3 according to the embodiment will be explained in this order.

2-1. Configuration Example of Information Processing Apparatus 4

With reference to FIG. 5, a configuration example of the information processing apparatus 4 illustrated in FIG. 1 will be explained. FIG. 5 is a block diagram illustrating a configuration example of devices in the information processing system 100 according to the embodiment. The information processing apparatus 4 includes an input unit 41, an output unit 42, a communication unit 43, the storage 44, and a control unit 45.

2-1-1. Input Unit 41

The input unit 41 is in charge of input of various kinds of information into the above-mentioned information processing apparatus 4. For example, the input unit 41 is realized by a mouse, a keyboard, and the like so as to receive an input such as setting information for the above-mentioned information processing apparatus 4.

2-1-2. Output Unit 42

The output unit 42 is in charge of output of various kinds of information from the above-mentioned information processing apparatus 4. For example, the output unit 42 is realized by a display or the like so as to output setting information and the like stored in the above-mentioned information processing apparatus 4.

2-1-3. Communication Unit 43

The communication unit 43 is in charge of data communication with other devices. For example, the communication unit 43 executes data communication with other communication devices via a router. The communication unit 43 is capable of executing data communication with a terminal (not illustrated) of an operator.

2-1-4. Storage 44

The storage 44 stores therein various kinds of information to be referred in operation of the control unit 45, various kinds of information that is acquired in operation of the control unit 45, etc. The storage 44 includes a light receiving pattern storage 441. Herein, the storage 44 may be realized by using a semiconductor memory element such as a Random Access Memory (RAM) and a flash memory, a storage such as a hard disk and an optical disk, or the like. Note that in the example illustrated in FIG. 5, the storage 44 is arranged inside of the information processing apparatus 4; however, the storage 44 may be arranged outside of the information processing apparatus 4, and further a plurality of storages may be arranged.

2-1-4-1. Light Receiving Pattern Storage 441

The light receiving pattern storage 441 stores therein a reference light receiving pattern that is acquired by a second acquisition unit 453 of the control unit 45. For example, the light receiving pattern storage 441 stores therein a reference light receiving pattern for each combination of a type of the container 1 and a type of the object lens 21.

2-1-5. Control Unit 45

The control unit 45 is in charge of overall control of the above-mentioned information processing apparatus 4. The control unit 45 includes a first acquisition unit 451, a first specifying unit 452, the second acquisition unit 453, a third acquisition unit 454, a second specifying unit 455, an image capturing unit 456, and a drive unit 457. Herein, the control unit 45 may be realized by using an electric circuit such as a Central Processing Unit (CPU) and a Micro Processing Unit (MPU), or an integrated circuit such as an Application Specific Integrated Circuit (ASIC) and a Field Programmable Gate Array (FPGA).

2-1-5-1. First Acquisition Unit 451

The first acquisition unit 451 acquires pieces of image data obtained by capturing an image of a target object (sample 12) to be observed by using the microscope 2 at respective positions while driving the object lens 21 of the microscope 2 in a light-axis direction of an illumination with which the sample 12 is irradiated, the image being obtained by condensing light by using the object lens 21. In this case, the first acquisition unit 451 acquires image data captured by the camera 3.

The first acquisition unit 451 includes the plurality of partitions 11 each of which stores therein the sample 12, and acquires image data with respect to the first partition 11-1 of the container 1. In this case, the first acquisition unit 451 may acquire image data of a control sample that is different from the sample 12 stored in the first partition 11-1 of the container 1. Note that the first acquisition unit 451 may store the acquired image data in the storage 44.

2-1-5-2. First Specifying Unit 452

The first specifying unit 452 specifies a focusing position $Z_f$ of the object lens 21 at which a focus of the sample 12 is determined on the basis of image data. For example, the first specifying unit 452 specifies a focusing position $Z_f$ by using a feature amount of each piece of image data. In other words, the first specifying unit 452 specifies image data in which a focus coincides from among pieces of image data by using a luminance value and/or a contrast value as a feature amount of the image data, and further specifies a position of the object lens 21 of the corresponding piece of image data as a focusing position $Z_f$. Note that a specifying method of the first specifying unit 452 is not limited to the above-mentioned method.

2-1-5-3. Second Acquisition Unit 453

In a case where having arranged the object lens 21 at a focusing position $Z_f$, the second acquisition unit 453 acquires, as a reference light receiving pattern, a light receiving pattern obtained by receiving, via the object lens 21, the focus detecting light (reflected light) 228 with which the sample 12 is irradiated via the object lens 21, and further stores the reference light receiving pattern in the storage 44. For example, the second acquisition unit 453 acquires a reference light receiving pattern in a case where the object lens 21 specified from a feature amount of each piece of image data of the first partition 11-1 in the container 1 is arranged at a focusing position $Z_f$, and further stores the reference light receiving pattern in the light receiving pattern storage 441 of the storage 44.

The second acquisition unit 453 stores a reference light receiving pattern in the light receiving pattern storage 441 of the storage 44 for each combination of a type of the container 1 and a type of the object lens 21. The second acquisition unit 453 stores reference light receiving patterns in the light receiving pattern storage 441 of the storage 44, for example, "pattern AA" is a reference light receiving pattern with respect to a combination of a type "container A" of the container 1 and a type "object lens A" of the object lens 21, "pattern AB" is a reference light receiving pattern with respect to a combination of a type "container A" of the container 1 and a type "object lens B" of the object lens 21, and the like.

The second acquisition unit 453 may store a reference light receiving pattern in the light receiving pattern storage 441 of the storage 44 for each type of the container 1, or may store a reference light receiving pattern in the light receiving pattern storage 441 of the storage 44 for each type of the object lens 21. The second acquisition unit 453 stores reference light receiving patterns in the light receiving pattern storage 441 of the storage 44, for example, types "container A", "container B", and "container C", . . . , of the container 1 are respectively associated with reference light receiving patterns "pattern A-1", "pattern B-1", and "pattern C-1", . . . . The second acquisition unit 453 stores reference light receiving patterns in the light receiving pattern storage 441 of the storage 44, for example, types "object lens A", "object lens B", and "object lens C", . . . , of the object lens 21 are respectively associated with reference light receiving patterns "pattern A-2", "pattern B-2", and "pattern C-2", . . . .

2-1-5-4. Third Acquisition Unit 454

In a case where capturing the sample 12 again, the third acquisition unit 454 acquires light receiving patterns when the sample 12 is irradiated with a focus detecting light at respective positions obtained by driving the object lens 21 in a light-axis direction thereof. For example, in a case where capturing the sample 12 of which a type of the container 1 is the same and a type of the object lens 21 is the same, the third acquisition unit 454 is capable of acquiring light receiving patterns for a part or a whole of the sample 12 to be captured. The third acquisition unit 454 acquires light a receiving pattern with respect to the second partition 11-2 of the container 1. In other words, in a case where capturing the sample 12 again, when capturing the samples 12 of the second partition 11-2 and the following thereof after acquisition of a reference light receiving pattern in the first partition 11-1 of the container 1, the third acquisition unit 454 is capable of acquiring a light receiving pattern with respect to a part or a whole of the sample 12 to be captured.

2-1-5-5. Second Specifying Unit 455

The second specifying unit 455 specifies a capturing reference position $Z_{f1}$ of the object lens 21 for capturing the sample 12 by using a similarity degree between a reference light receiving pattern stored in the storage 44 and each light receiving pattern. For example, the second specifying unit 455 is capable of specifying a capturing reference position $Z_{f1}$ by using a similarity degree between already-acquired reference light receiving pattern and each light receiving pattern acquired in capturing. The second specifying unit 455 specifies a capturing reference position $Z_{f1}$ by using a similarity degree between a reference light receiving pattern acquired in the first partition 11-1 and each light receiving pattern acquired in the second partition 11-2. In other words, in the container 1 storing therein a plurality of partitions and the sample 12 is stored in each of the partitions, the second specifying unit 455 specifies a capturing reference position $Z_{f1}$ by using a similarity degree between a reference light receiving pattern acquired in the first partition 11-1 for specifying the reference light receiving pattern and each light receiving pattern acquired in the second partition 11-2 for capturing the sample 12.

In this case, for example, the second specifying unit 455 calculates a plurality of cross-correlation values between the reference light receiving pattern and the light receiving patterns, and specifies, as the capturing reference position $Z_{f1}$, a position of the object lens 21 where a light receiving pattern corresponding to the highest cross-correlation value of the cross-correlation values is acquired. Specifically, in a case where calculating that a cross-correlation value between a reference light receiving pattern and "light receiving pattern A" is "0.7", a cross-correlation value between the reference light receiving pattern and "light receiving pattern B" is "0.8", and a cross-correlation value between the reference light receiving pattern and "light receiving pattern C" is "0.9"; the second specifying unit 455 specifies, as a capturing reference position $Z_{f1}$, a position of the object lens 21 at which "light receiving pattern C" whose cross-correlation value, in other words, similarity degree approximates to one. Note that a method of the second specifying unit 455 for calculating a cross-correlation value is not particularly limited.

The second specifying unit 455 inputs each of the plurality of light receiving patterns and the reference light receiving pattern into a machine learning model that is trained to output a similarity degree between a pair of light receiving patterns in response to an input of the pair of light receiving patterns; acquires a plurality of similarity degrees respectively corresponding to the plurality of light receiving patterns; and specifies, as a capturing reference position $Z_{f1}$, a position of the object lens 21 where a light receiving pattern corresponding to the highest similarity degree of the plurality of similarity degrees is acquired. Specifically, in a case where a similarity degree between a reference light receiving pattern and "light receiving pattern A" is output to be "0.7", a similarity degree between the reference light receiving pattern and "light receiving pattern B" is output to be "0.8", and a similarity degree between the reference light receiving pattern and "light receiving pattern C" is output to be "0.9" by the machine learning model, the second specifying unit 455 specifies, as a capturing reference position $Z_{f1}$, a position of the object lens 21 where "light receiving pattern C" whose similarity degree approximates to one is acquired. Note that a method of the second specifying unit 455 for calculating a similarity degree is not particularly limited.

2-1-5-6. Image Capturing Unit 456

The image capturing unit 456 executes capturing on the sample 12 by using the microscope 2 in which the object lens 21 is arranged at a focusing position $Z_f$ where a reference light receiving pattern is acquired. For example, in a case where capturing the sample 12 whose type of the container 1 is the same and further whose type of the object lens 21 is the same, the image capturing unit 456 transmits a signal including a capturing instruction to the camera 3 (image capturing device) to be capable of executing capturing on the sample 12. The image capturing unit 456 executes capturing on the sample 12 that is stored in the second partition 11-2 by using the microscope 2 in which the object lens 21 is set at a capturing reference position $Z_{f1}$. In other words, in a case where capturing the samples 12 in the second partition 11-2 and the following after acquiring a reference light receiving pattern in the first partition 11-1 of the container 1, the image capturing unit 456 transmits a signal including a capturing instruction to the camera 3 (image capturing device) to be capable of execute capturing on the samples 12 stored in respective partitions, for example, the second partition 11-2, the third partitions 11-3, . . . .

2-1-5-7. Drive Unit 457

The drive unit 457 controls drive of the driving device 23 of the microscope 2. For example, the drive unit 457 transmits a signal to the driving device 23 so as to drive the object lens 21 that is connected with the driving device 23. Specifically, the drive unit 457 transmits a signal to the driving device 23 in order to acquire a light receiving pattern so as to drive the object lens 21 connected with the driving device 23 in a light-axis direction by $\Delta Z$ for each step. The drive unit 457 transmits a signal to the driving device 23 in order to capture a capturing reference position $Z_{f1}$ so as to drive the object lens 21 connected with the driving device 23 to a capturing reference position $Z_{f1}$.

2-2. Configuration Example of Microscope 2

With reference to FIG. 5, a configuration example of the microscope 2 illustrated in FIG. 1 will be explained. The microscope 2 includes the object lens 21, the focusing detection device 22, the driving device 23, and the imaging lens 24.

2-2-1. Object Lens 21

The object lens 21 is arranged between the container 1 and the focusing detection device 22 in a light-axis direction thereof, is driven by the driving device 23, and transmits or condenses an illumination light emitted from an illuminating device (not illustrated) in capturing, a focus detecting light emitted from the light emitting device 221 of the focusing detection device 22, and a focus detecting light reflected from a bottom surface of the container 1 and/or the sample 12.

2-2-2. Focusing Detection Device 22

The focusing detection device 22 is arranged between the object lens 21 and the imaging lens 24 in a light-axis direction, and includes the light emitting device 221, the first lens 222, the first light splitting element 223, the second light splitting element 224, the second lens 225, and the two-dimensional light sensor 226.

2-2-2-1. Light Emitting Device 221

The light emitting device 221 irradiates the sample 12 in the container 1 with a focus detecting light via the object lens 21. In this case, the light emitting device 221 irradiates the sample 12 in the container 1 with a focus detecting light on the basis of a signal including a light emitting instruction, which is transmitted from the information processing apparatus 4. The light emitting device 221 stops irradiation of a focus detecting light on the basis of a signal including a light emission stopping instruction, which is transmitted from the information processing apparatus 4.

2-2-2-2. First Lens 222

The first lens 222 converts the focus detecting light (irradiation light) 227 emitted from the light emitting device 221 into a parallel light so as to lead it to the first light splitting element 223.

2-2-2-3. First Light Splitting Element 223

The first light splitting element 223 reflects a parallel light of the focus detecting light (irradiation light) 227 obtained by conversion of the first lens 222 so as to lead it to the second light splitting element 224. The first light splitting element 223 transmits the focus detecting light (reflected light) 228 that is reflected from the second light splitting element 224 so as to lead it to the second lens 225.

2-2-2-4. Second Light Splitting Element 224

The second light splitting element 224 reflects the focus detecting light (irradiation light) 227 that is reflected from the first light splitting element 223 so as to lead it to the object lens 21. The second light splitting element 224 reflects the focus detecting light (reflected light) 228 passed through the object lens 21 so as to lead it to the second lens 225.

2-2-2-5. Second Lens 225

The second lens 225 condenses the focus detecting light (reflected light) 228 reflected from the second light splitting element 224, and further leads it to the two-dimensional light sensor 226.

2-2-2-6. Two-dimensional Light Sensor 226

The two-dimensional light sensor 226 receives the focus detecting light (reflected light) 228 that is condensed by the second lens 225. The two-dimensional light sensor 226 outputs image data of a received light receiving pattern to the information processing apparatus 4.

2-2-3. Driving Devise 23

The driving device 23 drives the object lens 21 connected therewith. For example, the driving device 23 receives a signal transmitted from the drive unit 457 of the information processing apparatus 4 so as to drive the connected object lens 21.

2-2-4. Imaging Lens 24

The imaging lens 24 is arranged between the focusing detection device 22 and the camera 3 in a light-axis direction thereof, and transmits or condenses the observation light 5 emitted from the sample 12.

2-3. Process of Camera 3

With reference to FIG. 5, the camera 3 that is the image capturing device illustrated in FIG. 1 will be explained. The camera 3 captures images of the sample 12 obtained by condensing light by using the object lens 21, at positions while driving the object lens 21 of the microscope 2 in a light-axis direction of an illumination with which a target object (sample 12) is irradiated, the images are observed by using the microscope 2. For example, the camera 3 receives a signal transmitted from the image capturing unit 456 of the information processing apparatus 4 so as to capture the sample 12 of the container 1.

The camera 3 may capture a light receiving pattern of the focus detecting light (reflected light) 228. For example, the camera 3 may receive a signal transmitted from the image capturing unit 456 of the information processing apparatus 4 so as to capture a light receiving pattern of light received by the two-dimensional light sensor 226.

Capturing the sample 12 in the container 1 by using the camera 3 and execution of a process for acquiring a light receiving pattern by using the two-dimensional light sensor 226 achieves the following advantage. First, a general focus detecting light uses light whose wavelength is different from that of light used in capturing a cell sample, and thus in a case where a focus detecting light is to be received by the camera 3, restriction arises in a microscope capturing optical system up to the camera 3; however, the above-mentioned process is free from such a disadvantage.

Next, in a focus detecting process in capturing a cell sample, it is ideal to dynamically execute matching of light receiving patterns while continuously moving the object lens 21, and thus a logic circuit for image processing may be connected to the two-dimensional light sensor 226 and the following so as to realize a configuration and a process for quickly executing pattern matching. In this case, a built-in ready-made camera for high-sensitivity capturing is generally employed for the camera 3 for capturing a cell sample, and thus addition of the above-mentioned circuit is difficult so that it is preferable to employ one other than a cell-sample capturing camera for a light-receptive sensor of a focus detecting light.

3. Flow of Process of Information Processing System 100

Figure 6:
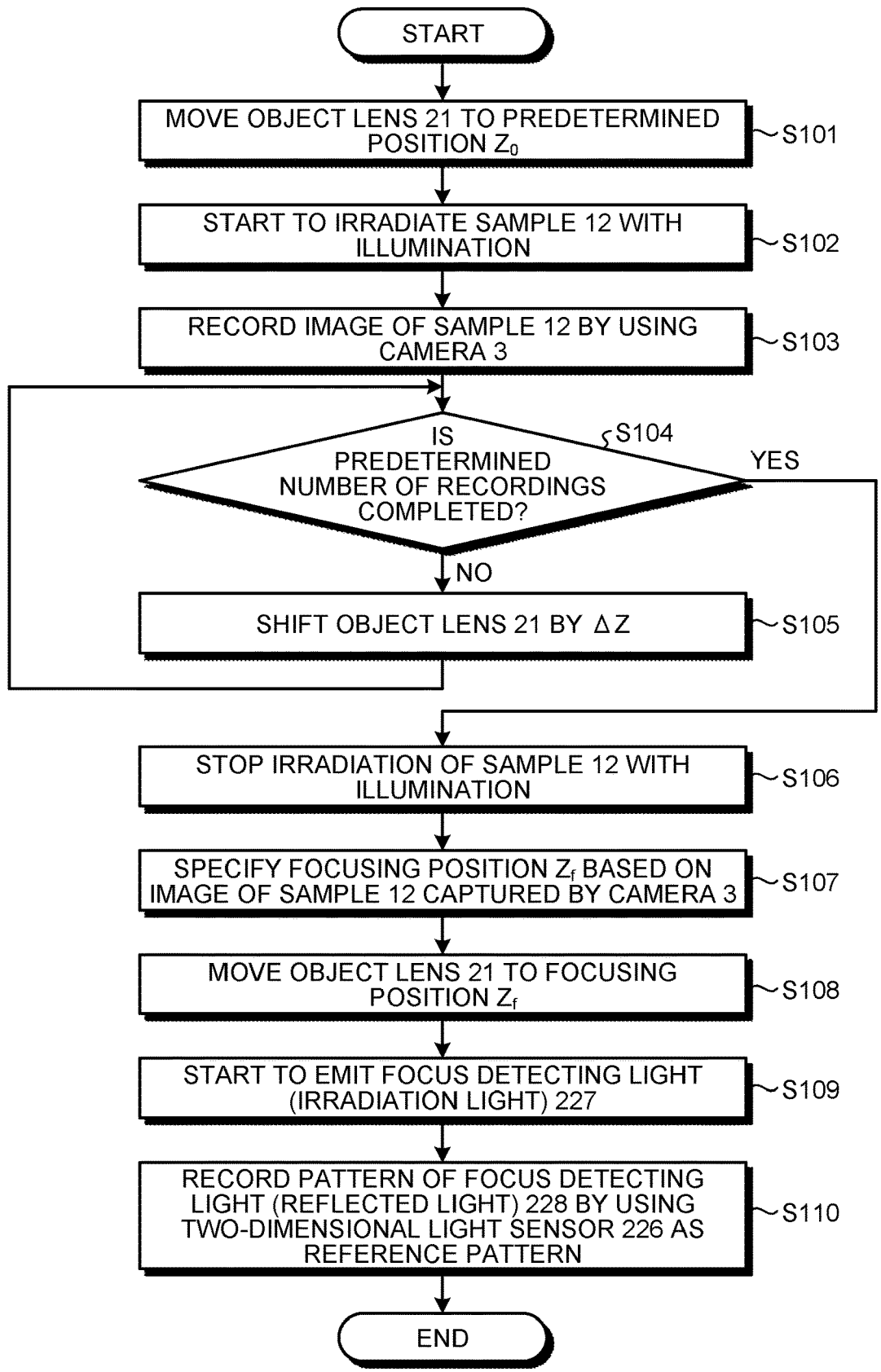
FIG. 6 is a flowchart illustrating one example of a flow of a reference light receiving pattern specifying process according to the embodiment.
Figure 7:
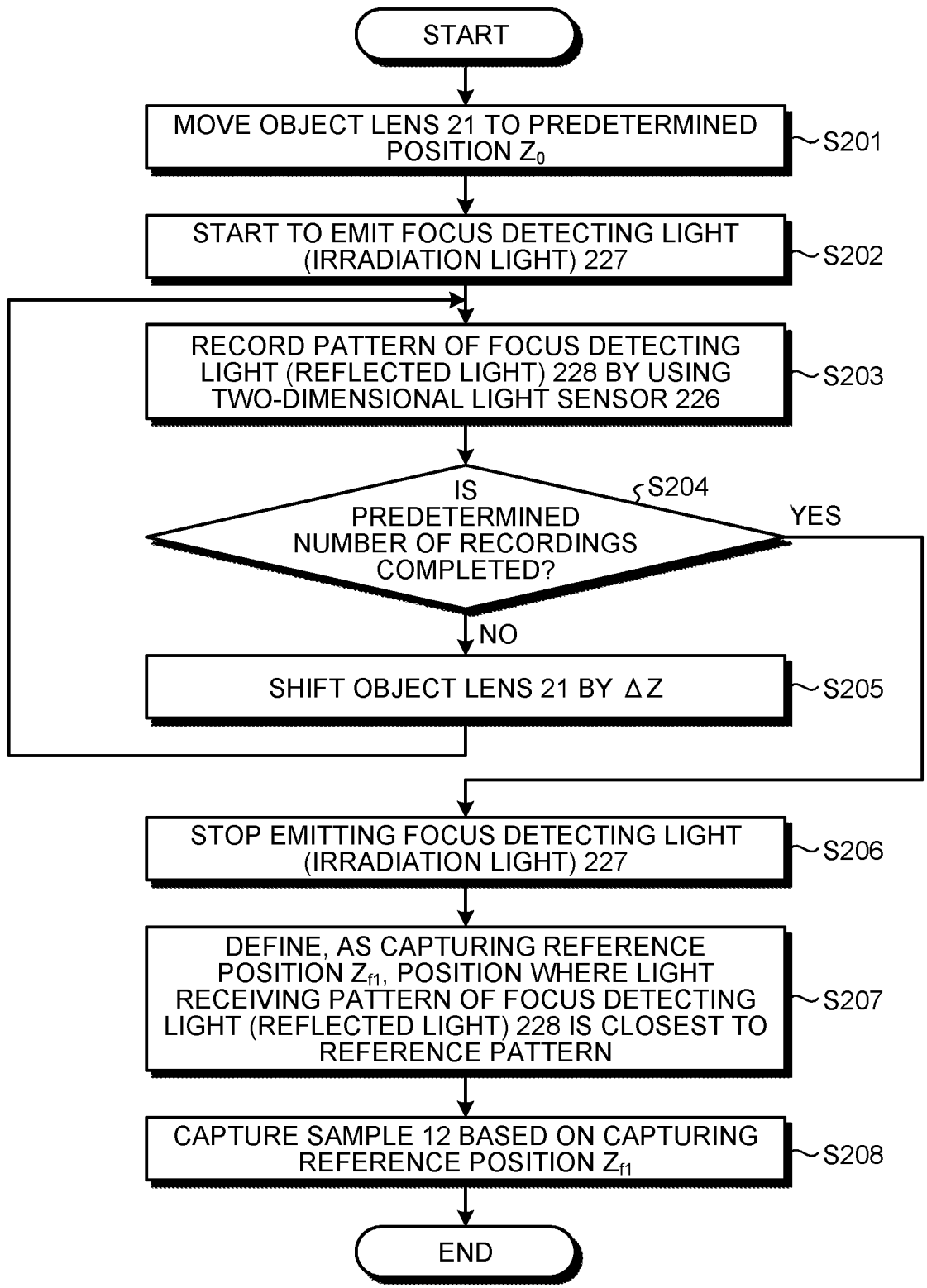
FIG. 7 is a flowchart illustrating one example of a flow of the sample capturing process according to the embodiment.

With reference to FIG. 6 to FIG. 7, a flow of a process of the information processing system 100 according to the embodiment will be explained. Hereinafter, a flow of the reference light receiving pattern specifying process and a flow of the sample capturing process will be explained.

3-1. Flow of Reference Light Receiving Pattern Specifying Process

With reference to FIG. 6, a flow of a reference light receiving pattern specifying process according to the embodiment will be explained. FIG. 6 is a flowchart illustrating one example of a flow of a reference light receiving pattern specifying process according to the embodiment. Steps S101 to S110 to be explained hereinafter may be executed in a different order. Furthermore, a part of Steps S101 to S110 to be explained hereinafter may be skipped.

3-1-1. Process of Step S101

First, the drive unit 457 of the information processing apparatus 4 controls drive of the driving device 23 in the microscope 2, and further moves the object lens 21 to a predetermined position $Z_0$ (Step S101).

3-1-2. Process of Step S102

Next, an illuminating device start to irradiate the sample 12 with an illumination (Step S102). In this case, the illuminating device may start irradiation using an illumination on the basis of a signal including an irradiation starting instruction that is transmitted from the control unit 45 of the information processing apparatus 4.

3-1-3. Process of Step S103

Next, the camera 3 captures an image of the sample 12, and further records the captured image (Step S103). In this case, the camera 3 may capture an image of the sample 12 on the basis of a signal including a capturing instruction that is transmitted from the image capturing unit 456 of the information processing apparatus 4.

3-1-4. Process of Step S104

Next, the image capturing unit 456 of the information processing apparatus 4 executes confirmation whether or not the predetermined number of recordings by the camera 3 is completed (Step S104). In this step, in a case where the predetermined number of recordings is completed (Step S104: Yes), the image capturing unit 456 shifts the processing to Step S106. On the other hand, in a case where the predetermined number of recordings is not completed (Step S104: No), the image capturing unit 456 shifts the processing to Step S105.

3-1-5. Process of Step S105

Next, the drive unit 457 of the information processing apparatus 4 controls the driving device 23 of the microscope 2 to shift the object lens 21 by $\Delta Z$ (Step S105), and returns the processing to Step S104.

3-1-6. Process of Step S106

Next, the illuminating device stops irradiation of the sample 12 with the illumination (Step S106). In this step, the illuminating device may stop emitting the illumination in accordance with a signal including an emission stopping instruction that is transmitted from the control unit 45 of the information processing apparatus 4.

3-1-7. Process of Step S107

Next, the first specifying unit 452 of the information processing apparatus 4 specifies a focusing position $Z_f$ on the basis of an image of the sample 12 captured by the camera 3 (Step S107).

3-1-8. Process of Step S108

Next, the drive unit 457 of the information processing apparatus 4 controls the driving device 23 of the microscope 2 to move the object lens 21 to the focusing position $Z_f$ (Step S108).

3-1-9. Process of Step S109

Next, the light emitting device 221 of the microscope 2 starts to emit the focus detecting light (irradiation light) 227 (Step S109). In this step, the light emitting device 221 may start to emit the focus detecting light (irradiation light) 227 in accordance with a signal including an emission starting instruction that is transmitted from the control unit 45 of the information processing apparatus 4.

3-1-10. Process of Step S110

Next, the two-dimensional light sensor 226 of the microscope 2 receives the focus detecting light (reflected light) 228 (Step S110). In this step, the second acquisition unit 453 of the information processing apparatus 4 obtains and records image data received by the two-dimensional light sensor 226 as a reference light receiving pattern, and ends the processing.

3-2. Flow of Sample Capturing Process

With reference to FIG. 7, a flow of a sample capturing process according to the embodiment will be explained. FIG. 7 is a flowchart illustrating one example of a flow of a sample capturing process according to the embodiment. Steps S201 to S208 to be explained hereinafter may be executed in a different order. Furthermore, a part of Steps S201 to S208 to be explained hereinafter may be skipped.

3-2-1. Process of Step S201

First of all, the drive unit 457 of the information processing apparatus 4 controls the driving device 23 of the microscope 2 to move the object lens 21 to a predetermined position $Z_0$ (Step S201).

3-2-2. Process of Step S102

Next, the light emitting device 221 of the microscope 2 starts to emit the focus detecting light (irradiation light) 227 (Step S202). In this step, the light emitting device 221 may start to emit the focus detecting light (irradiation light) 227 in response to a signal including an emission starting instruction that is transmitted from the control unit 45 of the information processing apparatus 4.

3-2-3. Process of Step S203

Next, the two-dimensional light sensor 226 of the microscope 2 receives the focus detecting light (reflected light) 228 (Step S203). In this step, the third acquisition unit 454 of the information processing apparatus 4 obtains and records image data received by the two-dimensional light sensor 226 as a light receiving pattern.

3-2-4. Process of Step S204

Next, the third acquisition unit 454 of the information processing apparatus 4 executes confirmation whether or not the predetermined number of recordings is completed (Step S204). In this step, in a case where the predetermined number of recordings is completed (Step S204: Yes), the third acquisition unit 454 shifts the processing to Step S206. On the other hand, in a case where the predetermined number of recordings is not completed (Step S204: No), the third acquisition unit 454 shifts the processing to Step S205.

3-2-5. Process of Step S205

Next, the drive unit 457 of the information processing apparatus 4 controls the driving device 23 of the microscope 2 to shift the object lens 21 by $\Delta Z$ (Step S205), and returns the processing to Step S203.

3-2-6. Process of Step S206

Next, the light emitting device 221 of the microscope 2 stops emitting the focus detecting light (irradiation light) 227 (Step S206). In this step, the light emitting device 221 may stop emitting the focus detecting light (irradiation light)

227 in response to a signal including an emission stopping instruction that is transmitted from the control unit 45 of the information processing apparatus 4.

3-2-7. Process of Step S207

Next, the second specifying unit 455 of the information processing apparatus 4 defines, as a capturing reference position $Z_{f1}$, a position of the object lens 21 where a light receiving pattern of the focus detecting light (reflected light) 228 is the closest to the reference light receiving pattern (Step S207).

3-2-8. Process of Step S208

Next, the camera 3 captures an image of the sample 12 on the basis of the capturing reference position $Z_{f1}$ and records it (Step S208), and further ends the processing. In this step, the camera 3 may capture the image of the sample 12 on the basis of a signal including a capturing instruction that is transmitted from the image capturing unit 456 of the information processing apparatus 4.

4. Effects of Embodiment

Finally, effects of the embodiment will be explained. Hereinafter, effects 1 to effects 7 corresponding to the processes according to the embodiment will be explained.

4-1. Effects 1

First, the process according to the above-mentioned embodiment includes: acquiring pieces of image data obtained by capturing an image of the sample 12 to be observed by using the microscope 2 at respective positions of the object lens 21 of the microscope 2 while driving the object lens 21 in a light-axis direction of an illumination with which the object lens 21 is irradiated, the image of the sample 12 being obtained by condensing light by using the object lens 21; specifying a focusing position $Z_f$ of the object lens 21 at which a focus of the sample 12 is determined based on the pieces of image data; in a case where the object lens 21 is arranged in the focusing position $Z_f$, acquiring, as a light receiving pattern, a reference light receiving pattern obtained by receiving, via the object lens 21, the reflected light 228 of a focus detecting light emitted to the sample 12 via the object lens 21; and storing the reference light receiving pattern in the storage 44. Thus, the process according to the embodiment is capable of quickly executing automatic focusing.

4-2. Effects 2

Next, the process according to the above-mentioned embodiment includes: capturing the sample 12 by using the microscope 2 in which the object lens 21 is arranged at the focusing position $Z_f$ where the reference light receiving pattern is acquired. Thus, the process according to the embodiment is capable of quickly executing automatic focusing, and further of capturing the sample 12.

4-3. Effects 3

Next, the process according to the above-mentioned embodiment includes: in a case where the sample 12 is captured again, acquiring a plurality of light receiving patterns at respective positions of the object lens 21 driven along the light-axis direction in a case where the sample 12 is irradiated with the focus detecting light; specifying a capturing reference position $Z_{f1}$ of the object lens 21 that captures the sample 12 by using a similarity degree between the reference light receiving pattern stored in the storage 44 and each of the plurality of light receiving patterns; and capturing the sample 12 by using the microscope 2 in which the object lens 21 is arranged at the capturing reference position $Z_{f1}$. Thus, the process according to the embodiment is capable of quickly executing automatic focusing, and further of effectively capturing the sample 12.

4-4. Effects 4

Next, the process according to the above-mentioned embodiment includes: acquiring the pieces of image data with respect to the first partition 11-1 of the container 1 that includes the plurality of partitions 11 and stores the respective samples 12 in the plurality of partitions 11; specifying the focusing position $Z_f$ by using a feature amount of each of the pieces of image data; acquiring the reference light receiving pattern in a case where the object lens 21 is arranged at the focusing position $Z_f$; storing the reference light receiving pattern in the storage 44; acquiring the plurality of light receiving patterns with respect to the second partition 11-2 of the container 1; specifying the capturing reference position $Z_{f1}$ by using the similarity degrees between the reference light receiving pattern and the plurality of light receiving patterns; and capturing the sample 12 stored in the second partition 11-2 by using the microscope 2 in which the object lens 21 is arranged at the capturing reference position $Z_{f1}$. Thus, the process according to the embodiment is capable of quickly executing automatic focusing on the container 1 including the plurality of partitions 11, and further of effectively capturing the samples 12.

4-5. Effects 5

Next, the process according to the above-mentioned embodiment includes: storing the reference light receiving pattern in the storage 44 for each of combinations of a type of the container 1 and a type of the object lens 21. Thus, in a case where a type of the container 1 and a type of the object lens 21 are the same, the process according to the embodiment is capable of more quickly executing automatic focusing, and further of effectively capturing the sample 12.

4-6. Effects 6

Next, the process according to the above-mentioned embodiment includes: calculating a plurality of cross-correlation values between the reference light receiving pattern and the plurality of light receiving patterns; and specifying, as the capturing reference position $Z_{f1}$, a position of the object lens 21 where a light receiving pattern corresponding to a highest value of the cross-correlation values is acquired. Thus, the process according to the embodiment is capable of more effectively and more quickly executing automatic focusing, and further of effectively capturing the sample 12.

4-7. Effects 7

Next, the process according to the above-mentioned embodiment includes: inputting each of the plurality of light receiving patterns and the reference light receiving pattern into a machine learning model that is trained to output a similarity degree between a pair of light receiving patterns in response to an input of the pair of light receiving patterns; acquiring a plurality of similarity degrees respectively corresponding to the plurality of light receiving patterns; and specifying, as the capturing reference position $Z_{f1}$, a position of the object lens 21 where a light receiving pattern corresponding to a highest value of the plurality of similarity degrees is acquired. Thus, the process according to the embodiment is capable of more effectively and more quickly executing automatic focusing by using a machine learning model, and further of effectively capturing the sample 12.

System

Any of the processing procedures, the controlling procedures, the specific appellations, and the information including various data and parameters, which are described in the specification and the accompanying drawings, may be arbitrarily changed if not otherwise specified.

The illustrated components of the devices are functionally conceptual, and thus they are not to be physically configured as illustrated in the drawings. Specific forms of distribution and integration of the configuration elements of the illustrated devices are not limited to those illustrated in the drawings, and all or some of the devices can be configured by separating or integrating the apparatus functionally or physically in any unit, according to various types of loads, the status of use, etc.

Moreover, all or arbitrary part of the various processing functions, which are to be executed by each of the devices, may be executed by a CPU or a program that is analyzed and executed by the CPU, or may be realized as hardware by a wired logic.

Hardware

Figure 8:
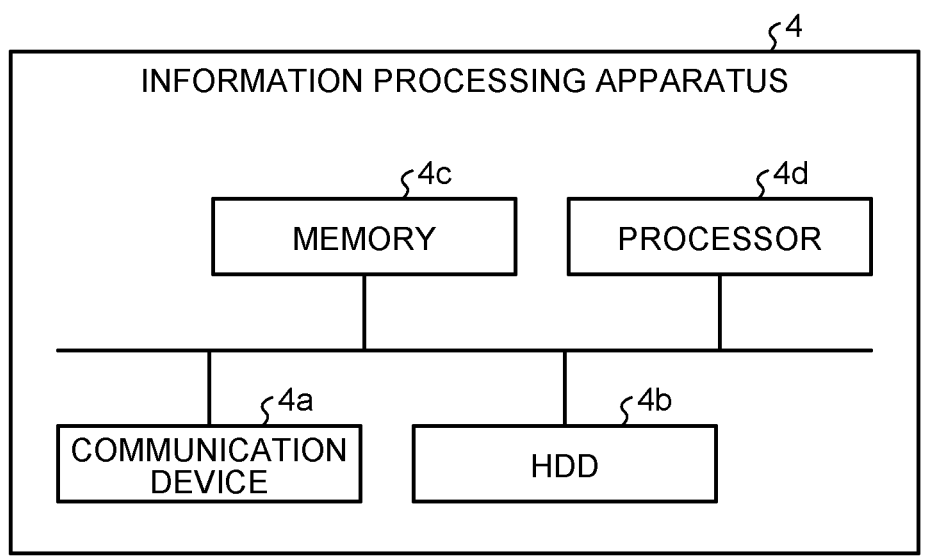
FIG. 8 is a diagram illustrating a hardware configuration example.

Next, a hardware configuration example of the information processing apparatus 4 will be explained. FIG. 8 is a diagram illustrating a hardware configuration example. As illustrated in FIG. 8, the information processing apparatus 4 includes a communication device 4a, a Hard Disk Drive (HDD) 4b, a memory 4c, and a processor 4d. The units illustrated in FIG. 8 are connected to each other by using a bus or the like.

The communication device 4a includes a network interface card or the like so as to communicate with another server. The HDD 4b stores therein a program and a database (DB) for operating the function illustrated in FIG. 5.

The processor 4d reads out a program that executes processes similar to the processing units illustrated in FIG. 5 from the HDD 4b and the like and expands the program into the memory 4c so as to operate a program that executes functions having described with reference to FIG. 5 and the like. For example, the process executes functions similar to each processing unit included in the information processing apparatus 4. Specifically, the processor 4d reads out, from the HDD 4b and the like, a program including functions similar to those of the first acquisition unit 451, the first specifying unit 452, the second acquisition unit 453, the third acquisition unit 454, the second specifying unit 455, the image capturing unit 456, the drive unit 457, and the like. The processor 4d executes a process for executing processes similar to those of the first acquisition unit 451, the first specifying unit 452, the second acquisition unit 453, the third acquisition unit 454, the second specifying unit 455, the image capturing unit 456, the drive unit 457, and the like.

As described above, the information processing apparatus 4 reads out and executes a program so as to operate as an information processing apparatus that executes various processing methods. The computer 100 may read out the program from a recording medium by using a medium reading device, and executes the above-mentioned read program so as to realize functions similar to those according the above-mentioned embodiment. Note that the above-mentioned program is not limitedly executed by the information processing apparatus 4 alone. For example, the present disclosure may similarly apply to a case where a computer or a server having another hardware configuration executes a program and a case where a computer and a server cooperate to execute a program.

The program may be distributed via a network such as the Internet. The program is recorded in a computer-readable recording medium such as a hard disk, a flexible disk (FD), a CD-ROM, a Magneto-Optical disk (MO), and a Digital Versatile Disc (DVD); and is read out from the recording medium by a computer to be executed.

According to the present disclosure, there are achieved effects that automatic focusing can be quickly executed.

What is claimed is:

1. An information processing apparatus comprising:
a first acquisition unit that acquires pieces of image data obtained by capturing an image of a target object to be observed by using a microscope at respective positions of an object lens of the microscope while driving the object lens in a light-axis direction of an illumination with which the target object is irradiated, the image being obtained by condensing light by using the object lens;
a first specifying unit that specifies a focusing position of the object lens at which a focus of the target object is determined based on the pieces of image data; and
a second acquisition unit that
in a case where the object lens is arranged in the focusing position, acquire, as a reference light receiving pattern, a light receiving pattern obtained by receiving, via the object lens, reflected light of a focus detecting light emitted to the target object via the object lens, and
store the reference light receiving pattern in a storage.

2. The information processing apparatus according to claim 1, further including:
an image capturing unit that captures the target object by using the microscope in which the object lens is arranged at the focusing position where the reference light receiving pattern is acquired.

3. The information processing apparatus according to claim 2, further including:
a third acquisition unit that acquires, in a case where the target object is captured again, a plurality of light receiving patterns at respective positions of the object lens driven along the light-axis direction in a case where the target object is irradiated with the focus detecting light; and
a second specifying unit that specifies a capturing reference position of the object lens that captures the target object by using a similarity degree between the reference light receiving pattern stored in the storage and each of the plurality of light receiving patterns, wherein
the image capturing unit captures the target object by using the microscope in which the object lens is arranged at the capturing reference position.

4. The information processing apparatus according to claim 3, wherein
the first acquisition unit acquires the pieces of image data with respect to a first partition of a container that includes a plurality of partitions and stores the respective target objects in the plurality of partitions,
the first specifying unit specifies the focusing position by using a feature amount of each of the pieces of image data,
the second acquisition unit
  acquire the reference light receiving pattern in a case where the object lens is arranged at the focusing position, and
  store the reference light receiving pattern in the storage,
the third acquisition unit acquires the plurality of light receiving patterns with respect to a second partition of the container,
the second specifying unit specifies the capturing reference position by using the similarity degrees between the reference light receiving pattern and the plurality of light receiving patterns, and
the image capturing unit captures the target object stored in the second partition by using the microscope in which the object lens is arranged at the capturing reference position.

5. The information processing apparatus according to claim 4, wherein
the second acquisition unit stores the reference light receiving pattern in the storage for each of combinations of a type of the container and a type of the object lens.

6. The information processing apparatus according to claim 4, wherein
the second specifying unit
  calculate a plurality of cross-correlation values between the reference light receiving pattern and the plurality of light receiving patterns, and
  specify, as the capturing reference position, a position of the object lens where a light receiving pattern corresponding to a highest value of the cross-correlation values is acquired.

7. The information processing apparatus according to claim 4, wherein
the second specifying unit
  input each of the plurality of light receiving patterns and the reference light receiving pattern into a machine learning model that is trained to output a similarity degree between a pair of light receiving patterns in response to an input of the pair of light receiving patterns,
  acquire a plurality of similarity degrees respectively corresponding to the plurality of light receiving patterns, and
  specify, as the capturing reference position, a position of the object lens where a light receiving pattern corresponding to a highest value of the plurality of similarity degrees is acquired.

8. An information processing system comprising:
an image capturing device;
a microscope; and
an information processing apparatus, wherein
the image capturing device captures a plurality of images of a target object to be observed by using the microscope at respective positions of an object lens of the microscope while driving the object lens in a light-axis direction of an illumination with which the target object is irradiated, the image being obtained by condensing light by using the object lens,
the microscope includes a light emitting device that emits a focus detecting light toward the target object via the object lens, and
the information processing apparatus includes:
  a first acquisition unit that acquires pieces of image data obtained by capturing the image of the target object to be observed by using the image capturing device;
  a first specifying unit that specifies, based on the pieces of image data, a focusing position of the object lens at which a focus of the target object is determined; and
  a second acquisition unit that
    in a case where the object lens is arranged in the focusing position, acquire, as a reference light receiving pattern, a light receiving pattern obtained by receiving, via the object lens, reflected light of the focus detecting light emitted to the target object via the object lens, and
    store the reference light receiving pattern in a storage.

9. An information processing method comprising:
acquiring pieces of image data obtained by capturing an image of a target object to be observed by using a microscope at respective positions of an object lens of the microscope while driving the object lens in a light-axis direction of an illumination with which the target object is irradiated, the image being obtained by condensing light by using the object lens;
based on the pieces of image data, specifying a focusing position of the object lens at which a focus of the target object is determined;
in a case where the object lens is arranged in the focusing position, acquiring, as a reference light receiving pattern, a light receiving pattern obtained by receiving, via the object lens, reflected light of a focus detecting light emitted to the target object via the object lens; and
storing the reference light receiving pattern in a storage.

10. A computer-readable recording medium having stored therein an information processing program that causes a computer to execute a process comprising:
acquiring pieces of image data obtained by capturing an image of a target object to be observed by using a microscope at respective positions of an object lens of the microscope while driving the object lens in a light-axis direction of an illumination with which the target object is irradiated, the image being obtained by condensing light by using the object lens;
based on the pieces of image data, specifying a focusing position of the object lens at which a focus of the target object is determined;
in a case where the object lens is arranged in the focusing position, acquiring, as a reference light receiving pattern, a light receiving pattern obtained by receiving, via the object lens, reflected light of a focus detecting light emitted to the target object via the object lens; and
storing the reference light receiving pattern in a storage.

* * * * *